UNITED STATES PATENT OFFICE.

P. S. CHAPPELL AND W. H. CHAPPELL, OF BALTIMORE, MARYLAND.

IMPROVEMENT IN ARTIFICIAL MANURES.

Specification forming part of Letters Patent No. 6,234, dated March 27, 1849.

*To all whom it may concern:*

Be it known that we, PHILIP S. CHAPPELL and WILLIAM H. CHAPPELL, both of the city and county of Baltimore, in the State of Maryland, have invented or discovered a new and useful mixture or composition, used for improving and fertilizing land, called "Agricultural Salts"; and we do hereby declare the following to be a full and exact description of the way or manner of making and using the same.

In preparing or making a given quantity— say one hundred barrels—of this composition, we first make three vats or pits about nine feet long by four feet wide, and from two to three feet in depth, with brick walls and floors, all of which are well puddled to prevent leakage, into each of which vats we pour about fifty gallons of a liquor, usually obtained from gas manufactories, called or known by the name of "gas" or "ammoniacal liquor." We then add to the gas liquor contained in each vat, about half the weight of the bones, (to be added as hereinafter described,) of sulphuric acid (63° Baumé), by which a high degree of temperature is generated. We then deposit about thirty-three bushels of crushed bones in each vat, when the mixture of gas liquor, sulphuric acid, and crushed bones are well stirred and mixed together with a copper-headed rake, or instrument suitable for that purpose. The vats are then covered over with boards or plank, and so remain for the space of three days, at the expiration of which time the composition formed by the gas liquors, sulphuric acid, and crushed bones is ready to intermix with layers of compost made in the following manner: First, we take twenty-four barrels of the residuum from the manufacture of alum, (containing silica, silicate of alumina, some silicate of potash, and sulphate of alumina, with a small portion of sulphuric acid;) second, twenty barrels of the residuum from the manufacture of epsom salts, (containing silicate of magnesia, sulphate of lime, and sulphate of magnesia;) third, fifteen barrels of the sulphate of lime; fourth, ten barrels of the residuum from the manufacture of the prussiate of potash, (containing animal charcoal, silicate of potash, and a small quantity of the cyanuret and carbonate of potash;) fifth, one ton of the bisulphate of soda, (being a residuum from the manufacture of nitrous acid from the nitrate of soda and muriatic acid from the muriate of soda), and twenty bushels of common salt, all of which materials are deposited under a shed, in layers, intermixing therewith as equally as possible, as deposited, the composition formed in the vats from gas liquor, sulphuric acid, and crushed bones.

In order that each of all the before-mentioned materials of which the agricultural salts are made may be well mixed with the rest, we usually cut the heap thus deposited perpendicularly from the top to the bottom with a spade, so as to take small portions of each of the layers of the different materials of which it is composed and work them over, crushing all the lumps that may be found in the heap, and mixing in a very fine and even manner each of the component parts with the others. This process perfects the composition, it being then ready to put up in barrels for use.

These agricultural salts may be made of greater or less elementary strength by an increase or diminution of that component in which an increase or diminution of strength is desired.

The manner of using the agricultural salts is first to prepare the ground upon which they are to be put by plowing it, after which the agricultural salts are to be sown in such quantity as may be thought necessary for the land. They may then be harrowed into the soil.

Having thus fully shown and specifically described the nature of our discovery or invention and given a full and exact description of the manner of making and using the same, now what we claim, and desire to secure by Letters Patent, is—

The residuum from the manufacture of alum and the residuum from the manufacture of epsom salts, in combination with any or all of the hereinbefore-described materials for the purpose of making the mixture or a modification thereof, as hereinbefore described, which said composition or mixture is to be made in the way or manner, and to be used, as hereinbefore fully set forth.

PHILIP S. CHAPPELL.
WM. HENRY CHAPPELL.

Witnesses:
A. D. PENINGTON,
J. H. ALEXANDER.